US012344922B2

(12) United States Patent
Min et al.

(10) Patent No.: US 12,344,922 B2
(45) Date of Patent: Jul. 1, 2025

(54) ARSENIC IRON ALLOY, PREPARATION METHOD AND RESOURCE TREATMENT METHOD THEREOF

(71) Applicant: CENTRAL SOUTH UNIVERSITY, Changsha (CN)

(72) Inventors: Xiaobo Min, Changsha (CN); Fei Chai, Changsha (CN); Feiping Zhao, Changsha (CN); Liyuan Chai, Changsha (CN); Yanjie Liang, Changsha (CN); Cong Peng, Changsha (CN); Yiwei Zhou, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 0 days.

(21) Appl. No.: 18/819,299

(22) Filed: Aug. 29, 2024

(65) Prior Publication Data

US 2024/0417829 A1 Dec. 19, 2024

Related U.S. Application Data

(63) Continuation of application No. PCT/CN2023/117915, filed on Sep. 11, 2023.

(30) Foreign Application Priority Data

Sep. 21, 2022 (CN) .......................... 202211154283.6

(51) Int. Cl.
*C22C 33/02* (2006.01)
*C22C 38/00* (2006.01)
(52) U.S. Cl.
CPC ............ *C22C 33/02* (2013.01); *C22C 38/002* (2013.01)

(58) Field of Classification Search
None
See application file for complete search history.

(56) References Cited

FOREIGN PATENT DOCUMENTS

| CN | 102522154 A | * | 6/2012 |
| CN | 110422883 A | | 11/2019 |
| CN | 113136489 A | | 7/2021 |

OTHER PUBLICATIONS

Title of the Item: Engineering Materials and Forming Technology Publication Date: May 31, 2015 Name of the Author: Yanhua Zhang pp. P257.

* cited by examiner

*Primary Examiner* — Anthony M Liang
(74) *Attorney, Agent, or Firm* — George D. Morgan

(57) ABSTRACT

The present disclosure provides a preparation method of arsenic iron alloy, which includes the following steps: ball milling arsenic powder and iron powder under the protection of inert atmosphere according to a molar ratio of 0.1~0.35:1 or 0.35~2:1 to obtain pretreated material; vacuum hot pressed sintering the pretreated material to obtain arsenic iron alloy. The vacuum hot press sintering process includes: placing the pretreated material in a vacuum environment; and sintering the pretreated material; in the sintering process, a pressure of 30~50 MPa is applied to the pretreated material. The sintering process includes: heating the pretreated material from room temperature to 400~500° C., and holding for 0.5~1 h; and heating the pretreated material from 400~500° C. to 600~800° C., and holding for 0.5~1 h. The present disclosure can obtain arsenic iron alloy with high performance and low leaching toxicity.

4 Claims, 22 Drawing Sheets

ARSENIC IRON ALLOY, PREPARATION METHOD AND RESOURCE TREATMENT METHOD THEREOF

CROSS-REFERENCE TO RELATED APPLICATIONS

This application claims the benefit of priority from Chinese Patent Application No. 202211154283.6 entitled "ARSENIC IRON ALLOY, PREPARATION METHOD AND RESOURCE TREATMENT METHOD THEREOF" and filed on Sep. 21, 2022, the content of which is hereby incorporated by reference in its entire by reference.

TECHNICAL FIELD

The present disclosure relates to an arsenic iron alloy and a resource utilization of arsenic, in particular to an arsenic iron alloy, a preparation method and a resource treatment method.

BACKGROUND

Ore smelting process of non-ferrous metals, such as copper, antimony, gold, lead, zinc, tin, etc. is the most important source of arsenic pollution, and will cause serious pollution to the surrounding environment. At the same time, due to the toxicity of arsenic, the market for traditional arsenic products has shrunk sharply, resulting in a long-term downturn in the price of metal arsenic, eventually arsenic is stored in various hazardous wastes, and the risk of pollution is high, and non-ferrous smelting enterprises are facing great pressure. But arsenic is also a kind of resource, how to effectively recycle and expand the consumption of arsenic resources is of great significance.

For arsenic-containing pollutants, most of the measures taken by enterprises are mainly of harmless treatment such as solidification and stabilization, and are set up special warehouses for accumulation. However, these measures are still unable to effectively utilize arsenic resources, resulting in serious waste of arsenic resources.

In view of this, it is necessary to provide an arsenic iron alloy, a preparation method and a resource treatment method to solve or at least alleviate the technical defects of the above-mentioned difficulties in arsenic resource utilization.

SUMMARY

The purpose of the present disclosure is to provide an arsenic iron alloy, a preparation method and a resource treatment method, aiming at solving the technical problem of the difficulty of arsenic resource utilization.

To realize the above purpose, the present disclosure provides a preparation method for an arsenic iron alloy, including:

Ball milling arsenic powder and iron powder under the protection of inert atmosphere according to a molar ratio of 0.1~0.35:1 or 0.35~2:1 to obtain pretreated material;

Vacuum hot pressed sintering the pretreated material to obtain arsenic iron alloy;

Where, the vacuum hot press sintering process includes:

Placing the pretreated material in a vacuum environment; and

Sintering the pretreated material; in the sintering process, a pressure of 30~50 MPa is applied to the pretreated material;

Where the Sintering Process Includes:

Heating the pretreated material from room temperature to 400~500° C., and holding for 0.5~1 h; and Heating the pretreated material from 400~500° C. to 600~800° C., and holding for 0.5~1 h.

In some embodiments, the molar ratio of the arsenic powder to the iron powder is 0.1~0.35:1.

In some embodiments, the molar ratio of the arsenic powder to the iron powder is 0.35~2:1.

In some embodiments, the arsenic powder and the iron powder are mixed to obtain mixed powder before the ball milling process of the arsenic powder and the iron powder.

In some embodiments, the ball milling process includes a plurality of ball milling cycles, the ball milling duration of each ball milling cycle is 30 min to 60 min, and the interval duration of the adjacent two ball milling cycles is 5 min to 15 min;

In some embodiments, in the ball milling process, the rotating speed of the ball milling is 250 r/min to 400 r/min, the weight ratio of ball to material is 10~20:1, and the total time of the ball milling is 8 h to 48 h;

In some embodiments, the grain size of the ball used in the ball milling process is one or several of 3 mm, 6 mm, 10 mm and 15 mm; and In some embodiments, the purity of the arsenic iron powder and the arsenic iron powder are respectively not less than 98.0 wt. %.

In some embodiments, the inert atmosphere includes one or more of argon and nitrogen.

The present disclosure further provides an arsenic iron alloy prepared by the above preparation method.

The present disclosure further provides a resource treatment method of arsenic iron slag, includes:

Ball milling arsenic slag and iron slag under the protection of inert atmosphere according to a molar ratio of the arsenic element in the arsenic slag to the iron element in the iron slag of 0.1~0.35:1 or 0.35~2:1 to obtain pretreated material;

Vacuum hot pressed sintering the pretreated material to obtain treated arsenic material; Where, the vacuum hot press sintering process includes:

Placing the pretreated material in a vacuum environment; and

Sintering the pretreated material; in the sintering process, a pressure of 30~50 MPa is applied to the pretreated material;

Where the Sintering Process Includes:

Heating the pretreated material from room temperature to 400~500° C., and holding for 0.5~1 h; and Heating the pretreated material from 400~500° C. to 600~800° C., and holding for 0.5~1 h.

In some embodiments, the molar ratio of the arsenic slag to the iron slag is 0.1~0.35:1.

Compared with the prior art, the present disclosure has at least the following advantages:

1. The preparation cost of the present disclosure is low, and the purity requirement of raw materials is low. In addition, the high temperature treatment time of the present disclosure is short and the treatment temperature is relatively low.
2. The arsenic iron alloy of the present disclosure can be obtained by simple ball milling and hot pressed sintering, and the preparation process is relatively simple.
3. The arsenic iron alloy obtained by the present disclosure can be alloyed with arsenic and has higher crystallinity and purity.
4. The arsenic iron alloy obtained by the present disclosure has high performance and low leaching toxicity. In the present disclosure, the density of the arsenic iron alloy at room temperature is higher than 7 g*cm$^{-3}$, the compressive strength can reach more than 140 MPa, the hardness can reach 899.4HV0.5, and the leaching toxicity is low, which can be lower than the national standard (5 mg*L$^{-1}$), and has unexpected effects.

5. Based on the above performance, it is expected to effectively recycle arsenic, expand the absorption of arsenic resources, so as to effectively reduce the cost of arsenic slag and iron slag treatment by enterprises, and the arsenic iron alloy is expected to be made into arsenic products for sale and application, so as to improve the economy of arsenic slag and iron slag. For example, the arsenic iron alloy based on the present disclosure has high density, high strength, high hardness and low leaching toxicity, and is expected to be applied as a high-end alloy.

BRIEF DESCRIPTION OF DRAWINGS

In order to more clearly describe the technical scheme in the embodiment of the present disclosure or the prior art, the following is a brief introduction of the drawings required in the description of the embodiment or the prior art. It is obvious that the drawings described below are only some embodiments of the present disclosure. For ordinary technicians in the field, without creative labor, other drawings can also be obtained based on the structures shown in these drawings.

Figure 1A:
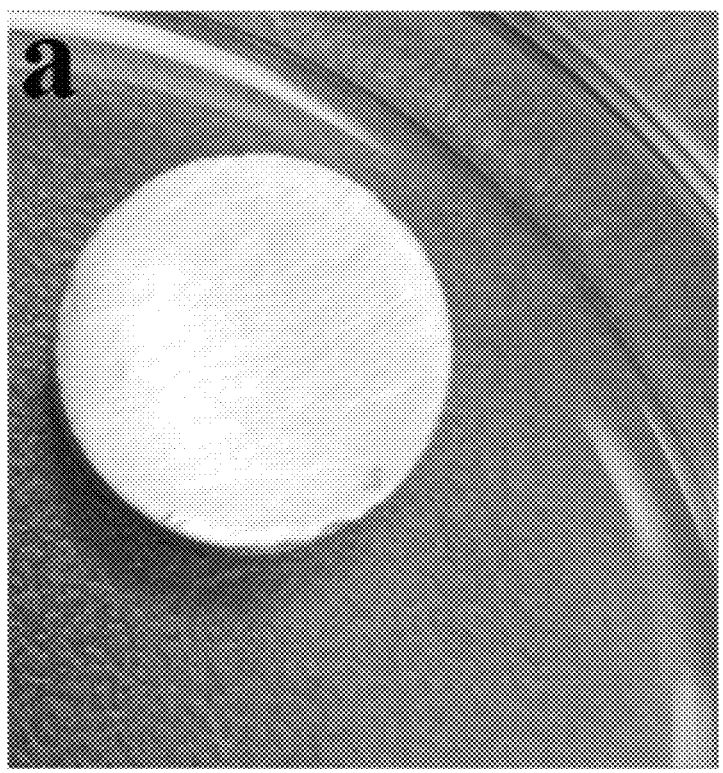
FIG. 1(a) is the appearance picture of the arsenic iron alloy in example 1 of the present disclosure.

The realization of the purpose, functional characteristics and advantages of the present disclosure will be further explained in combination with the embodiments and with reference to the attached drawings.

DETAILED DESCRIPTION OF THE EMBODIMENTS

The following is a clear and complete description of the technical scheme in the embodiments of the present disclosure in combination with the drawings attached to the embodiments of the present disclosure. Obviously, the embodiments described are only part of the embodiments of the present disclosure, not all embodiments. Based on the embodiments of the present disclosure, all other embodiments obtained by ordinary technicians in the field without creative labor fall within the scope of protection of the present disclosure.

Moreover, the technical schemes between embodiments of the present disclosure can be combined with each other, but must be based on the realization of ordinary technical personnel in the field, and when the combination of technical schemes is contradictory or impossible to realize, it shall be considered that the combination of such technical schemes does not exist and is not within the scope of protection required by the present disclosure.

In order to alloying arsenic resources, a large number of arsenic contaminant and iron slag can be melted at high temperature to obtain arsenic iron alloy blocks for carrying out further applications. This method can not only effectively deal with a large number of arsenic-containing pollutants and solve the problem of arsenic-containing solid waste accumulation for enterprises, but also can make the arsenic iron alloy blocks into arsenic iron alloy materials through this method, to increase profits for enterprises.

Traditional high temperature melting method is, however, not only high energy consumption, but the performance of the obtained arsenic iron alloy needing to be improved. In addition, the secondary pollution of arsenic and the leaching toxicity of arsenic in the arsenic iron alloy also need to be effectively prevented.

Based on these, the present disclosure provides a preparation method of arsenic iron alloy, including steps:

S1, arsenic powder and iron powder according to a molar ratio of 0.1~2:1, under the protection of inert atmosphere, are treated by a ball milling treatment, to obtain a pretreated material.

Before the ball milling treatment of the arsenic powder and the iron powder, the arsenic powder and the iron powder are mixed to obtain mixed powder. The purity of both the arsenic powder and the iron powder may be not less than 98.0 wt. %.

It should be noted that the molar ratio of arsenic to iron has a great influence on the properties and leaching toxicity of arsenic iron alloy. Moreover, the test proves that under the conditions of the present disclosure, when the proportion of the arsenic powder and the iron powder reaches a critical proportion, the performance of the arsenic iron alloy will be obviously declined, and the leaching toxicity of arsenic will be significantly increased.

When the molar ratio of the arsenic powder and the iron powder is 0.1-0.35:1, an arsenic iron alloy with extremely low leaching toxicity and excellent density, compressive strength and hardness can be obtained.

When the molar ratio of the arsenic powder and the iron powder is 0.35~2:1, an as-iron alloy with lower leaching toxicity and better density and hardness can be obtained.

As a description of the ball milling treatment, the ball milling treatment can be carried out in a vacuum ball milling tank, that is, the iron powder and arsenic powder are mixed according to different molar ratios and then put into the vacuum ball milling tank, and are ball-milled and mechanically alloyed under the protection of the inert atmosphere. The inert atmosphere may be one or several of argon and nitrogen. The lining material of vacuum ball milling tank can be stainless steel, corundum or cemented carbide. The milling ball is made of stainless steel, corundum or cemented carbide.

The ball milling treatment can include a plurality of ball milling cycles, the ball milling duration of each ball milling cycle is 30 min to 60 min, and the interval duration of the adjacent two ball milling cycles is 5 min to 15 min. That is, the ball milling process runs continuously for 30 min to 60 min, then pauses for 5 min to 15 min, and repeats until the ball milling is completed.

During the ball milling process, the rotating speed of the ball milling is 250 r/min to 400 r/min, the weight ratio of ball to material is 10~20:1, the total time of the ball milling process is 8 h to 48 h, and the total time of the ball milling process includes the pause time.

The grain size of the milling ball used in the ball milling process can be one or several of 3 mm, 6 mm, 10 mm and 15 mm.

S2, the pretreated material is vacuum hot pressed sintered to obtain the arsenic iron alloy.

Where, the vacuum hot press sintering process includes the following steps: The pretreated material is placed in a vacuum environment.

Then, the pretreated material is sintered. In the sintering process, a pressure of 30~50 MPa is applied to the pretreated material.

The sintering process includes the following steps:

The pretreated material is heated from room temperature to 400-500° C., and held for 0.5~1 h. Then, the pretreated material is heated from 400~500° C. to 600~800° C., and held for 0.5~1 h.

The vacuum hot press sintering process can be specifically understood as follows: the sintering is carried out under vacuum conditions, and in the sintering process, the pressure of 30~50 MPa is continuously applied to the pretreated material. And the pretreated material is heated from the room temperature to 400° C., held for 0.5~1 h, after holding, the pretreated material is heated from 400° C. to 600~800° C., held for 0.5~1 h. Pressure and temperature control can be synchronously processed to ensure the formation of hot pressing conditions to obtain arsenic iron alloy with high performance and low leaching toxicity.

That is, the pretreated material is placed in a vacuum hot pressed sintering furnace for hot pressed sintering. In the process of hot pressed sintering, the vacuum hot pressed sintering furnace is vacuumed for 10 to 20 minutes firstly.

After the vacuuming is finished, the temperature in the furnace is first raised to 400~500° C. and held for 0.5~1 h; then it is raised to 600~800° C. and held for 0.5~1 h, and then fell to room temperature with the furnace. In addition, with the temperature control, the pressure of the vacuum hot pressed sintering furnace is synchronously increased to 30 MPa~50 MPa, and held for 1~3 h, then fell to the chamber pressure with the furnace.

It is to be understood that by carrying out the specific processes in the above embodiments, in combination with hot pressing regulation, volatilization of arsenic can be avoided, while at the same time the acquisition of arsenic iron alloy with high strength, high hardness, and low leaching toxicity can be ensured.

It should also be understood that the compressive strength of the arsenic iron alloys in the present disclosure can reach 140 MPa, but it does not mean that the compressive strength of the arsenic iron alloy in the present disclosure can only reach 140 MPa, limited by the test conditions, the compressive strength of the arsenic iron alloy is only tested under the highest 140 MPa.

The present disclosure also provides an arsenic iron alloy prepared by the preparation method as described in any of the embodiments above.

In order to realize effective utilization of arsenic residue, avoid waste of arsenic resources, avoid secondary pollution of arsenic, and reduce leaching toxicity of arsenic, the present disclosure also provides a resource treatment method of arsenic iron slag, including steps:

S01, the arsenic slag and iron slag, according to the mole ratio of 0.1~2:1, under the protection of inert atmosphere, are treated by ball milling treatment, to obtain pretreated material.

Further, in order to fully reduce the leaching toxicity of arsenic while obtaining the arsenic iron alloy, the molar ratio of the arsenic slag and the iron slag is 0.1~0.35:1. As another alternative, the mole ratio of the arsenic slag and the iron slag is 0.35~2:1.

It should be noted that the molar ratio of the arsenic slag to the iron slag can be the molar ratio of the arsenic element in the arsenic slag to the iron element in the iron slag. When there are a large number of impurities in the arsenic slag and the iron slag, the arsenic slag and the iron slag can be purified before the resource treatment.

In addition, when only the arsenic slag is resourced, the iron slag can be replaced by iron powder. When only the iron slag is resourced, the arsenic slag can be replaced by arsenic powder.

S02, the pretreated material is vacuum hot pressed sintered to obtain treated arsenic material.

The vacuum hot pressed sintering process may include: placing the pretreated material in a vacuum environment; then, sintering the pretreated material, and in the sintering process, a pressure of 30~50 MPa is applied to the pretreated material;

The sintering process includes: heating the pretreated material from room temperature to 400~500° C., and holding for 0.5~1 h; then, heating the pretreated material from 400~500° C. to 600~800° C., and holding for 0.5~1 h.

It should be noted that, all the preparation processes in the arsenic iron alloy preparation method of the present disclosure can be applied in part or in whole to the recycling treatment method of arsenic iron slag. In the application, it is possible to replace arsenic powder with arsenic slag, and/or replace iron powder with iron slag.

In order to facilitate the technical person in the field to make specific understanding, examples are provided to illustrate the present disclosure:

It should be noted that "a Fe" in the drawings attached to the specification of the present disclosure refers to "aFe" in the following examples.

Example 1

Step 1. Arsenic powder with purity of 98 wt. % and iron powder with purity of 99.5 wt. % are mixed according to the molar ratio of 0.1:0.9 and then are put into a vacuum ball milling tank.

Step 2. The vacuum ball milling tank in step 1 is placed on a high-energy planetary ball mill. The lining material of the vacuum ball mill tank is stainless steel, the milling ball is stainless steel, the milling balls are 6 mm balls and 10 mm balls distributed according to the weight ratio of 1:1, the weight ratio of ball to material is 20:1, and the mechanical alloying reaction is carried out under the rotation speed of 340 r/min. In the reaction process, continuous operation for 30 min was followed by pauses for 5 min, the reaction time was 40 h (including the pauses time), and the sample was taken out after the mechanical alloying reaction was completed.

Step 3. The sample obtained in step 2 is put into a vacuum hot pressed sintering furnace mold, and is vacuumed for 20 min to avoid the presence of oxygen.

Subsequently, the vacuum hot press sintering furnace is controlled to perform vacuum hot press sintering on the sample according to the following settings:

Raising the temperature to 400° C. at a rate of 10° C./min and holding for 30 min, then raising to 800° C. at a rate of 10° C./min and holding for 60 min, and finally falling to room temperature with the furnace;

When controlling the temperature, synchronously controlling the pressure rising to 30 MPa at a rate of 0.5 MPa/s and holding for 160 min, and finally decreasing to the chamber pressure at a rate of 0.5 MPa/s.

The arsenic iron alloy (A1) in this example is obtained when the temperature is dropped to room temperature and the pressure is reduced to the chamber pressure (no more pressure is applied).

Figure 1B:
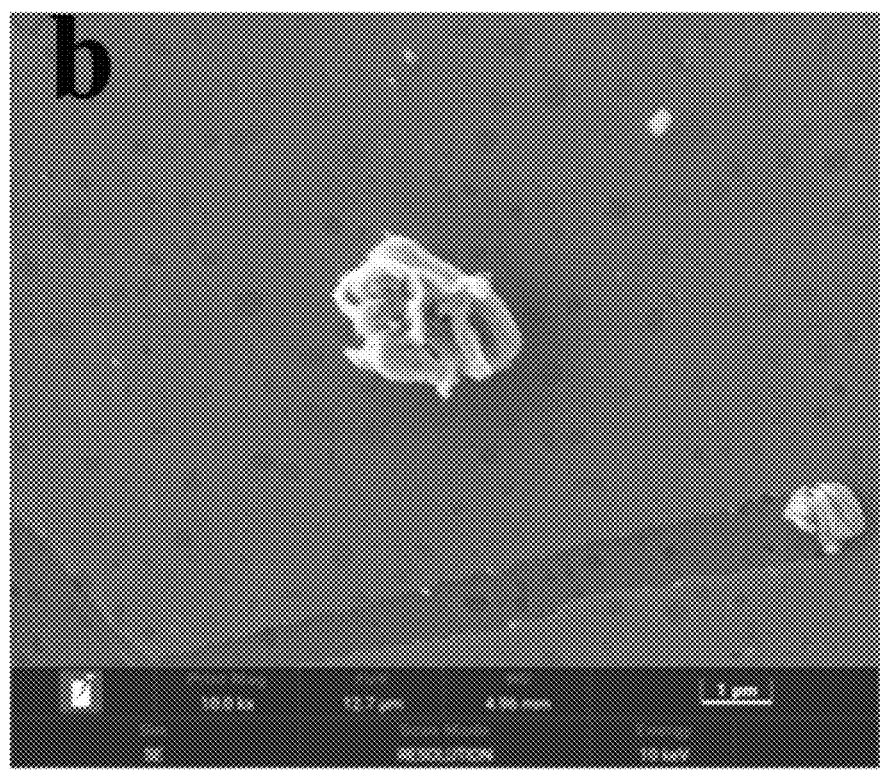
FIG. 1(b) is the topography picture of the arsenic iron alloy amplified 10 kx times in example 1 of the present disclosure.

Test Results:

The appearance picture of the arsenic iron alloy in the present example is shown in FIG. 1(a). It can be seen that the arsenic iron alloy obtained in the present example is cylinder shaped with a diameter of about 12 mm;

It can be seen from the topography picture of FIG. 1(b) that the arsenic iron alloy obtained at this ratio is generally uniform, with some iron elements agglomerating, a small number of grains on the surface and a large pore size.

Figure 2:
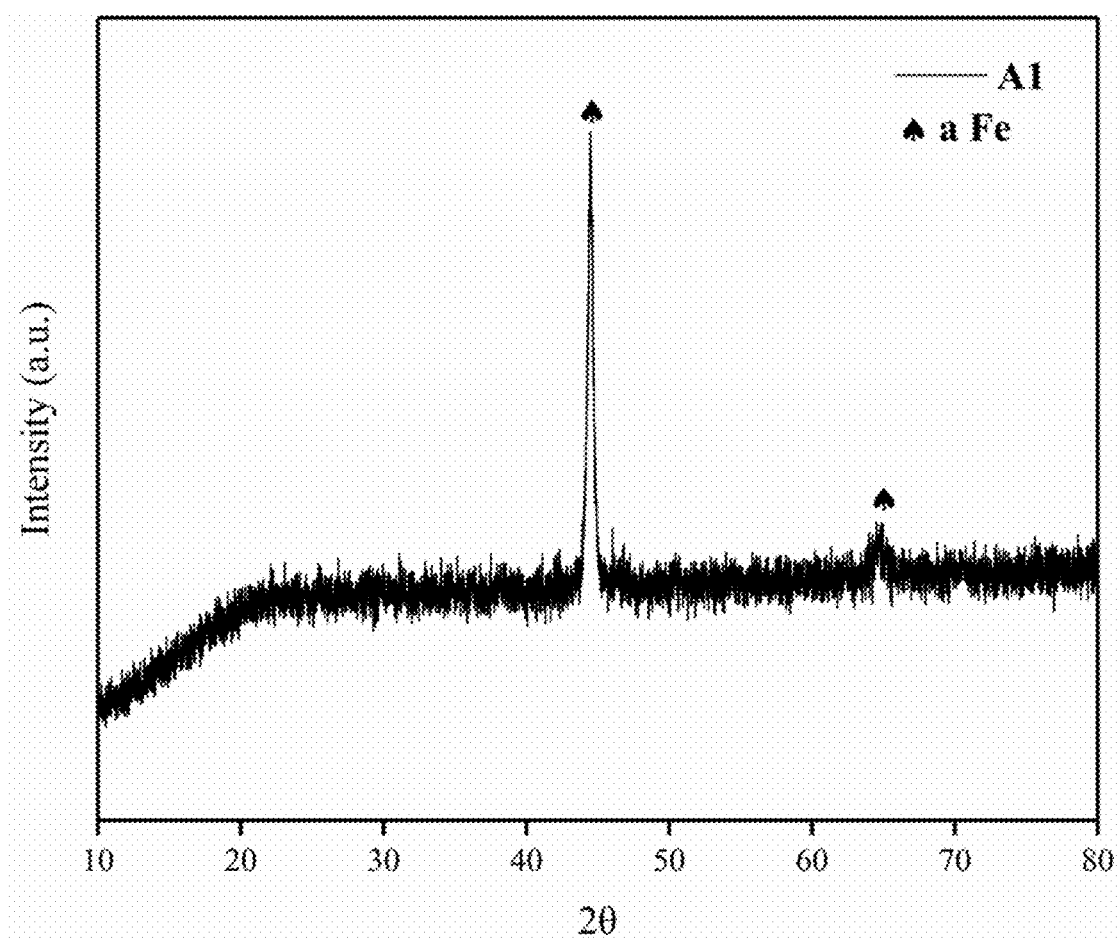
FIG. 2 is the XRD pattern of the arsenic iron alloy in example 1 of the present disclosure.

From the XRD pattern in FIG. 2, it can be seen that the arsenic iron alloy (A1) obtained in present example is basically a Fe due to its low arsenic content.

The properties of the arsenic iron alloy in present example are shown in analysis Example 1, and it can be seen that the arsenic iron alloy in present example has excellent alloy properties and extremely low leaching toxicity.

Example 2

During the test, compared with Example 1, only the molar ratio of the arsenic powder to the iron powder in step 1 is adjusted to 0.15:0.85 in present example.

Test Results:

The appearance picture of the arsenic iron alloy in the present example is the same as that in Example 1, which is cylinder shaped with a diameter of about 12 mm.

Figure 3B:
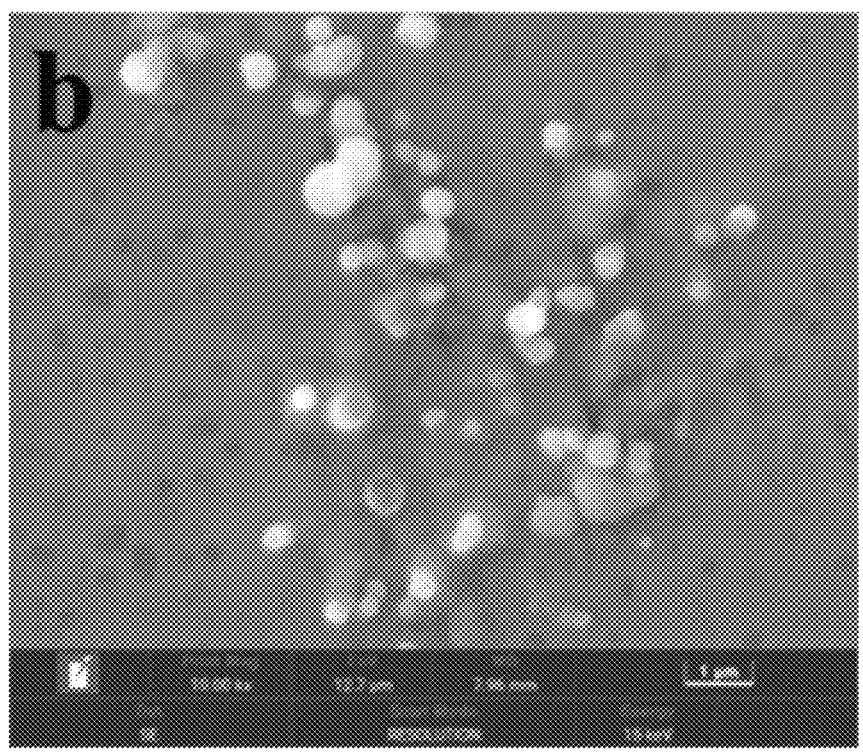
FIG. 3(b) is the topography picture of the arsenic iron alloy amplified 10 kx times in example 2 of the present disclosure.

It can be seen from the topography picture of FIG. 3(b) that the arsenic iron alloy is generally uniform. Compared with Example 1, the agglomeration degree decreases, the surface grain size increases and the grain size decreases.

Figure 4:
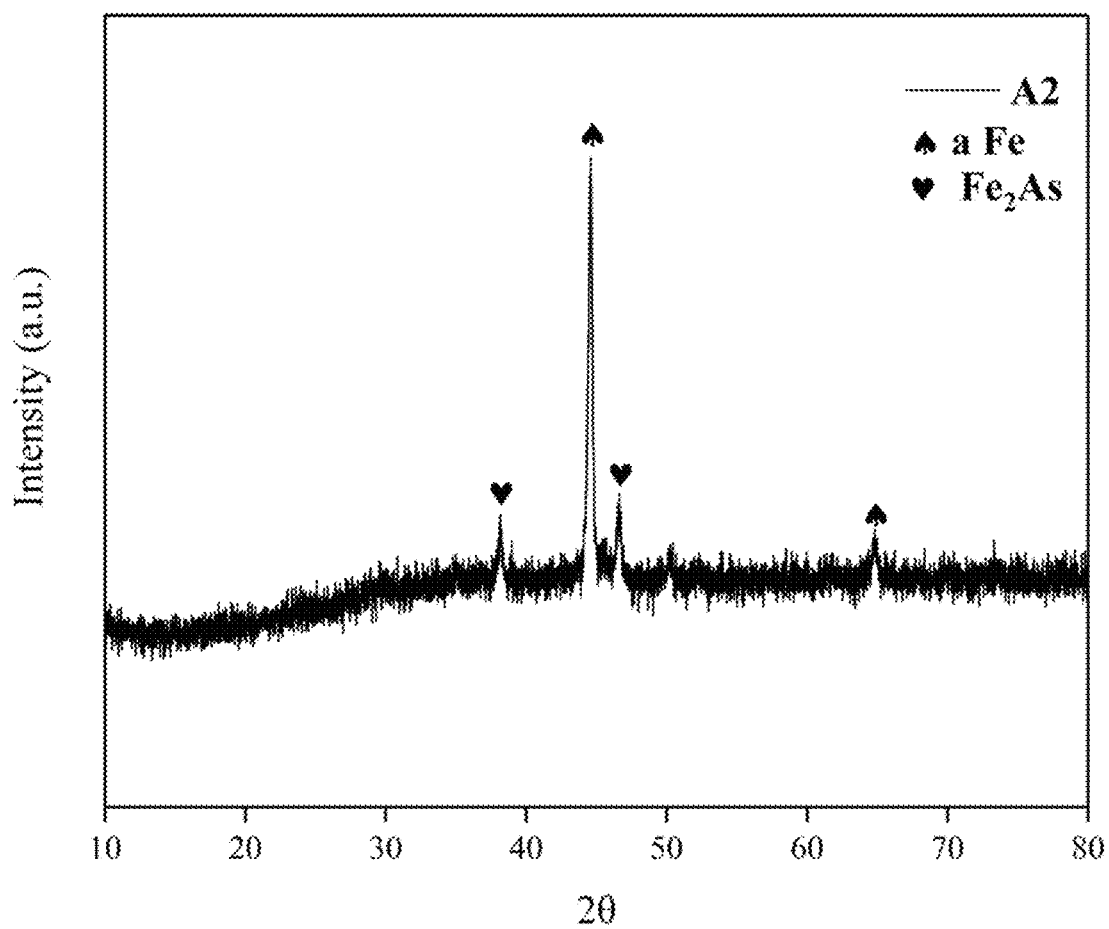
FIG. 4 is the XRD pattern of the arsenic iron alloy in example 2 of the present disclosure.

From the XRD pattern in FIG. 4, it can be seen that, due to the increase of arsenic content, the main phase of the arsenic iron alloy (A2) in present example is a Fe and weaker FezAs phase.

The properties of the arsenic iron alloy in present example are shown in analysis Example 1. It can be seen that the arsenic iron alloy in present example has excellent alloy properties and extremely low leaching toxicity. The increase of hardness may be attributed to the decrease of grain size and the increase of fine grain strengthening effect.

Example 3

During the test, compared with Example 1, only the molar ratio of the arsenic powder to the iron powder in step 1 is adjusted to 0.2:0.8 in present example.

Test Results:

The appearance picture of the arsenic iron alloy in the present example is the same as that in example 1, which is cylinder shaped with a diameter of about 12 mm.

Figure 5B:
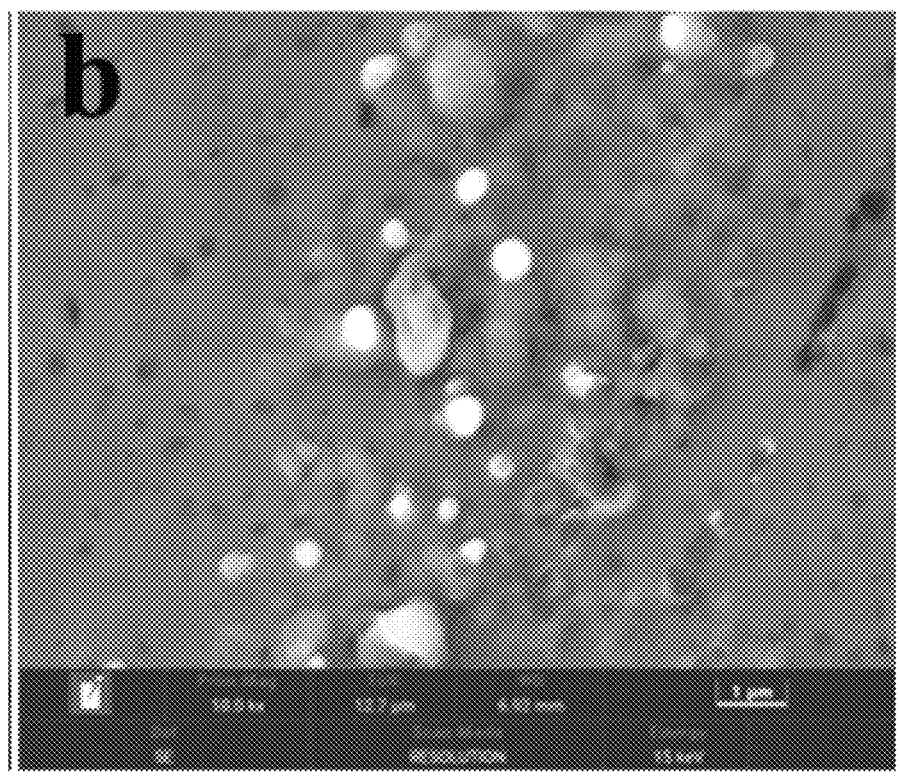
FIG. 5(b) is the topography picture of the arsenic iron alloy amplified 10 kx times in example 3 of the present disclosure.

It can be seen from the topography picture of FIG. 5(b) that the arsenic iron alloy is generally uniform. Compared with Example 1, the agglomeration degree decreases, the surface grain size increases, and the hardness decreases.

Figure 6:
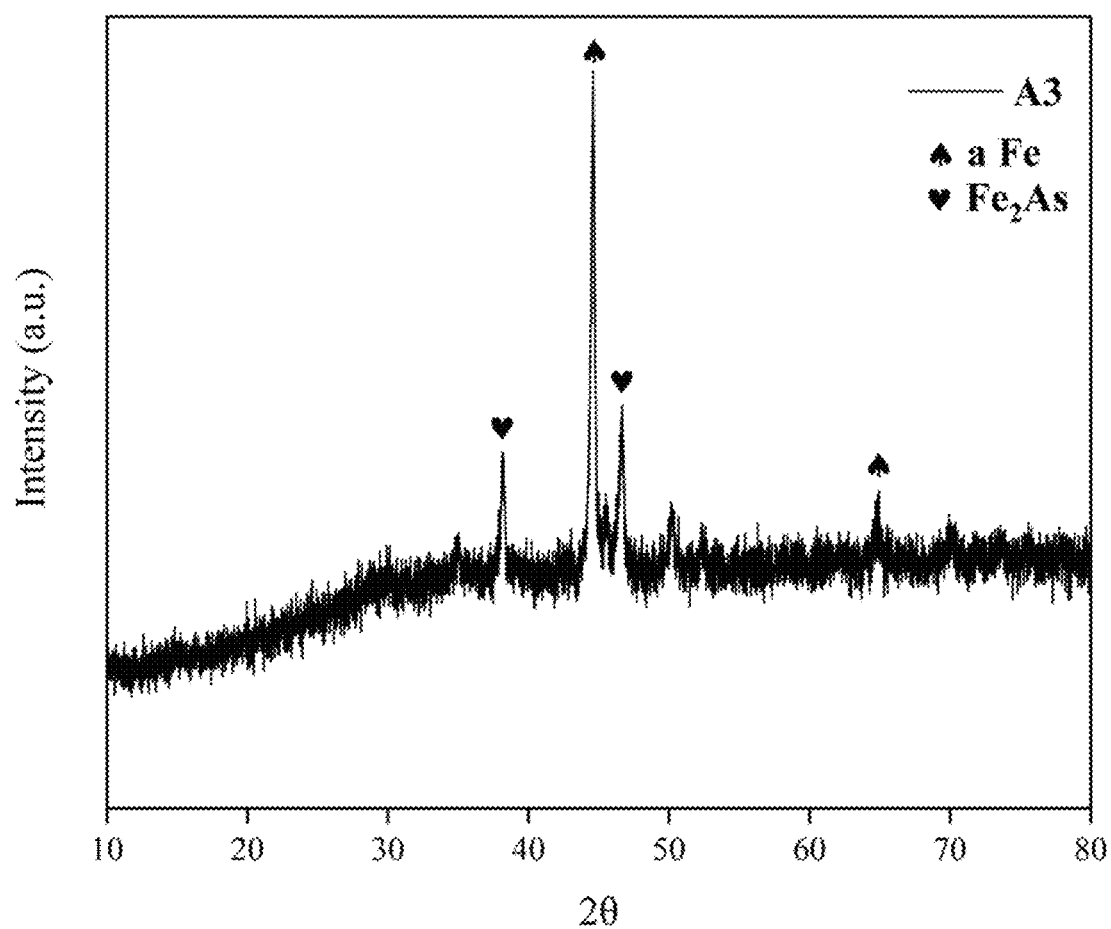
FIG. 6 is the XRD pattern of the arsenic iron alloy in example 3 of the present disclosure.

From the XRD pattern in FIG. 6, it can be seen that due to the increase of arsenic content, the main phases of the arsenic iron alloy (A3) in present example are a Fe and $Fe_2As$ phases. Compared with Example 2, the characteristic peak strength of $Fe_2As$ phase is enhanced.

The properties of the arsenic iron alloy in present example are shown in analysis Example 1, and it can be seen that the arsenic iron alloy in present example has excellent alloy properties and extremely low leaching toxicity.

Example 4

During the test, compared with Example 1, only the molar ratio of the arsenic powder to the iron powder in step 1 is adjusted to 0.25:0.75 in present example.

Test Results:

The appearance picture of the arsenic iron alloy in the present example is the same as that in example 1, which is cylinder shaped with a diameter of about 12 mm.

Figure 7B:
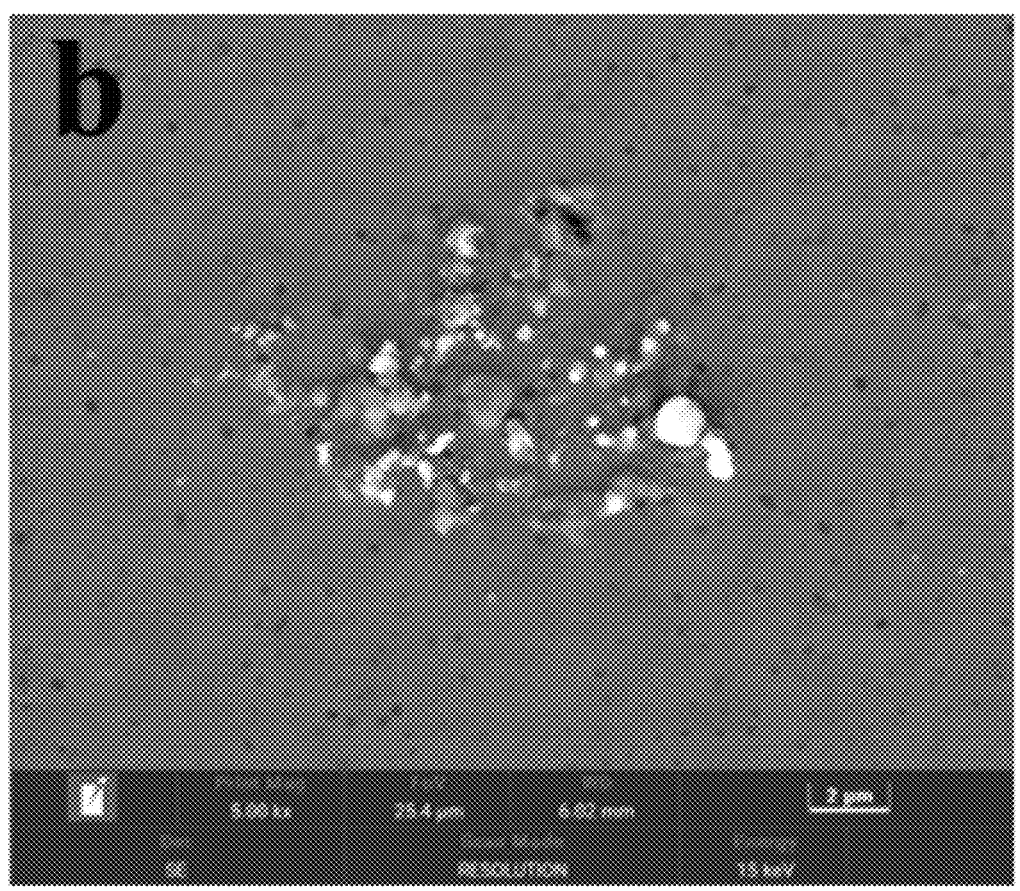
FIG. 7(b) is the topography picture of the arsenic iron alloy amplified 5 kx times in example 4 of the present disclosure.

It can be seen from the topography picture of FIG. 7(b) that the arsenic iron alloy is generally uniform. Compared with Example 1, the agglomeration degree decreases, the surface grain size increases and the grain size further decreases.

Figure 8:
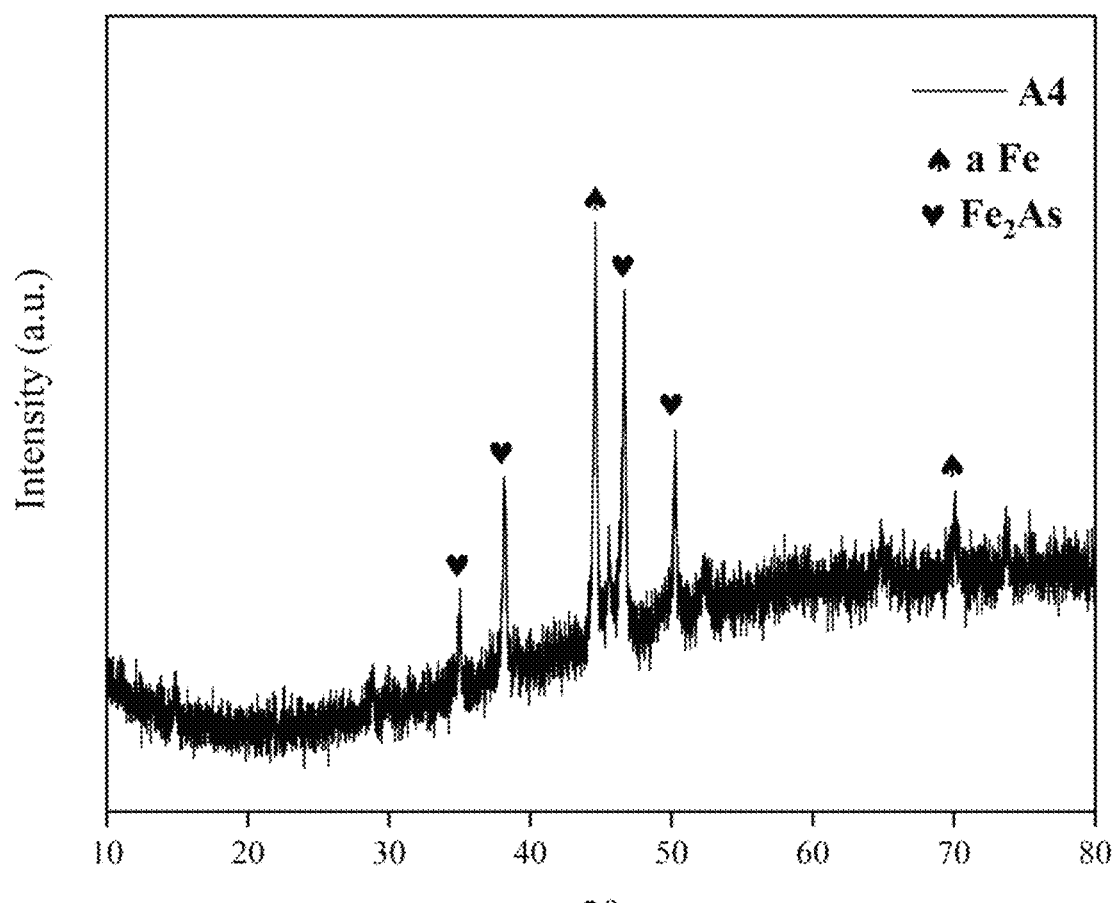
FIG. 8 is the XRD pattern of the arsenic iron alloy in example 4 of the present disclosure.

From the XRD pattern in FIG. 8, it can be seen that with the increase of arsenic content, the main phases of the arsenic iron alloy (A4) in present example are a Fe and FezAs phases. Compared with Example 1~3, the characteristic peak strength of FezAs phase is enhanced, the characteristic peak strength of a Fe phase is reduced.

The properties of the arsenic iron alloy in present example are shown in analysis Example 1, and it can be seen that the arsenic iron alloy in present example has excellent alloy properties and extremely low leaching toxicity.

Example 5

During the test, compared with Example 1, only the molar ratio of the arsenic powder to the iron powder in step 1 is adjusted to 0.3:0.7 in present example.
Test Results:

The appearance picture of the arsenic iron alloy in present example is the same as that in Example 1, which is cylinder shaped with a diameter of about 12 mm.

Figure 9B:
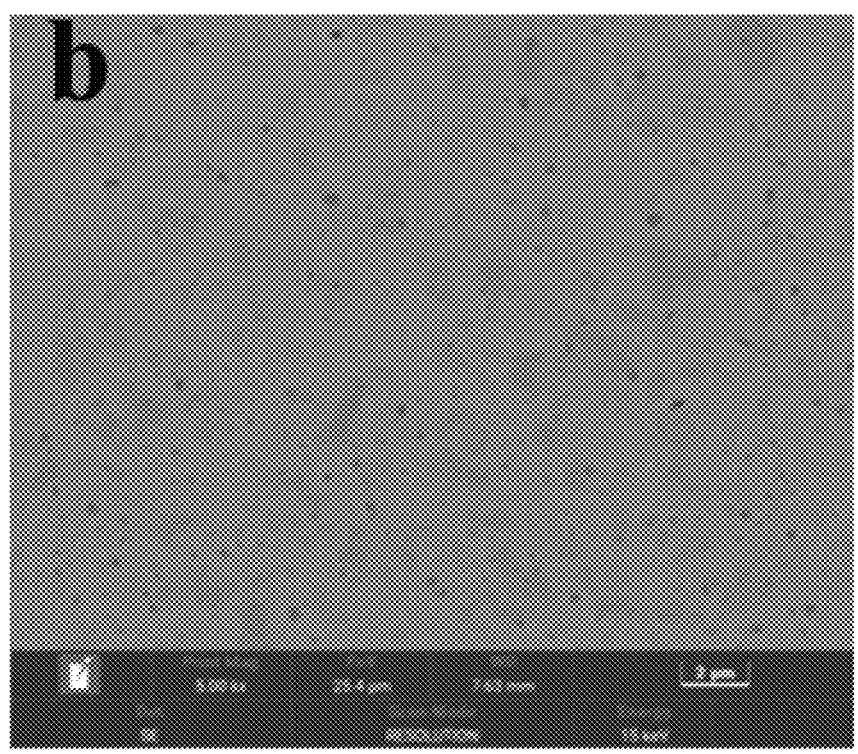
FIG. 9(b) is the topography picture of the arsenic iron alloy amplified 5 kx times in example 5 of the present disclosure.

It can be seen from the topography picture of FIG. 9(b) that the arsenic iron alloy is generally uniform. Compared with Example 1, there is no agglomeration of iron elements and the surface grain size is smaller.

Figure 10:
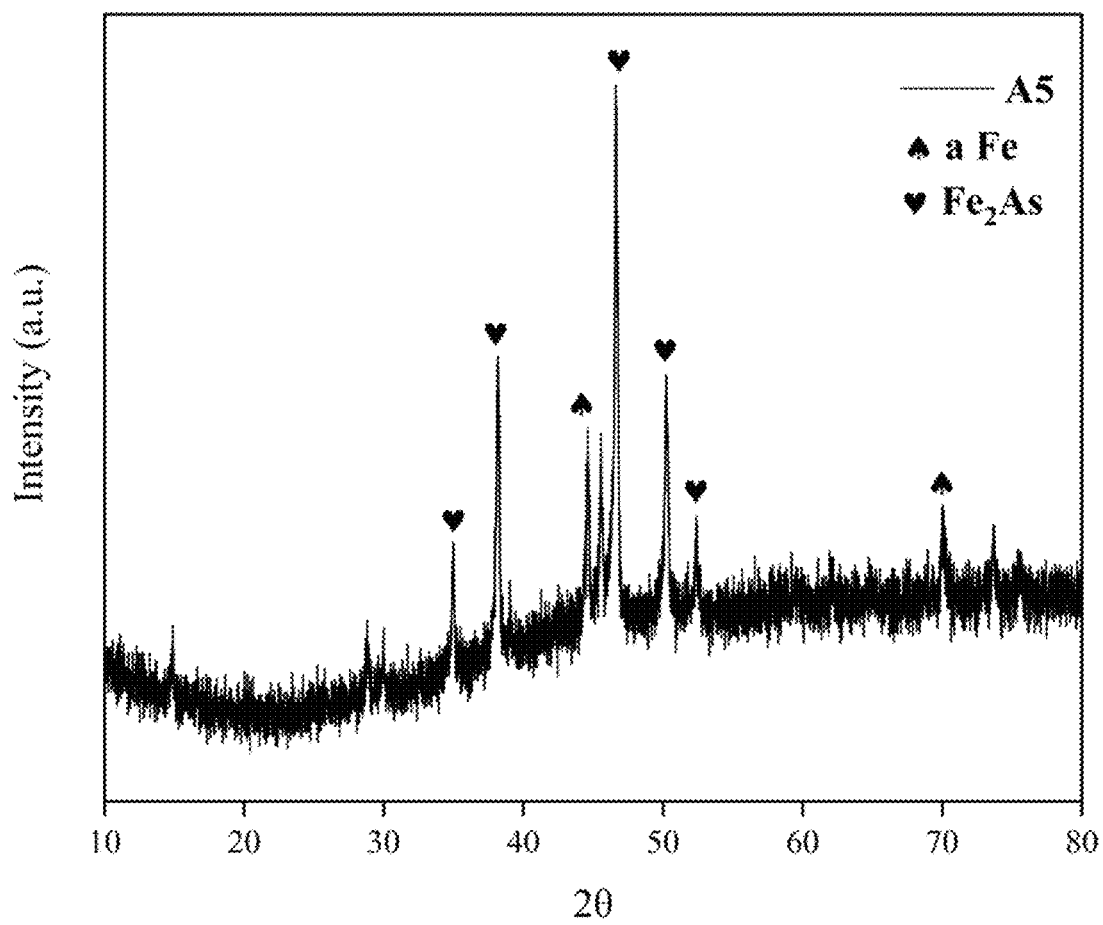
FIG. 10 is the XRD pattern of the arsenic iron alloy in example 5 of the present disclosure.

As can be seen from the XRD pattern in FIG. 10, with the increase of arsenic content, the main phase of the arsenic iron alloy (A5) in present example is $Fe_zAs$ phase and weaker a Fe phase. Compared with the phase of Example 4, the characteristic peak strength of $Fe_2As$ phase is enhanced, and the characteristic peak strength of a Fe phase is significantly reduced.

The properties of the arsenic iron alloy in present example are shown in analysis Example 1. It can be seen that the arsenic iron alloy in present example has outstanding alloy properties and low leaching toxicity.

Example 6

During the test, compared with Example 1, only the molar ratio of the arsenic powder to the iron powder in step 1 is adjusted to 0.35:0.65 in present example.
Test Results:

The appearance picture of the arsenic iron alloy in the present example is the same as that in Example 1, which is cylinder shaped with a diameter of about 12 mm.

Figure 11B:
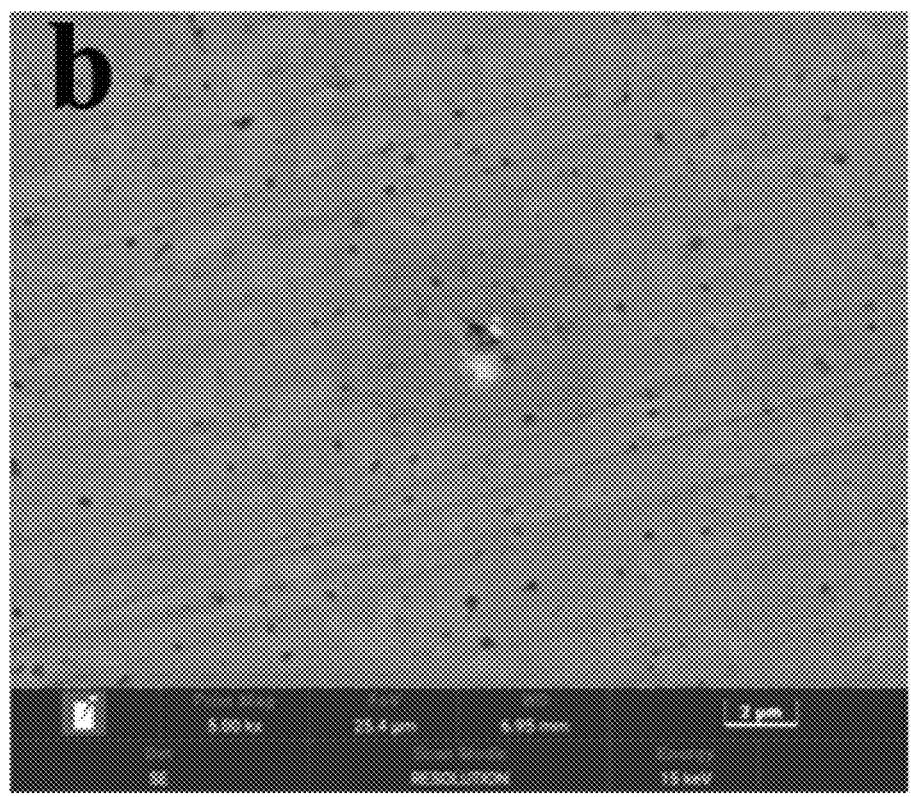
FIG. 11(b) is the topography picture of the arsenic iron alloy amplified 5 kx times in example 6 of the present disclosure.

It can be seen from the topography picture of FIG. 11(b) that the arsenic iron alloy is generally uniform. Compared with Example 1, there is no agglomeration of iron elements, and the surface grain increases and the size thereof is smaller.

Figure 12:
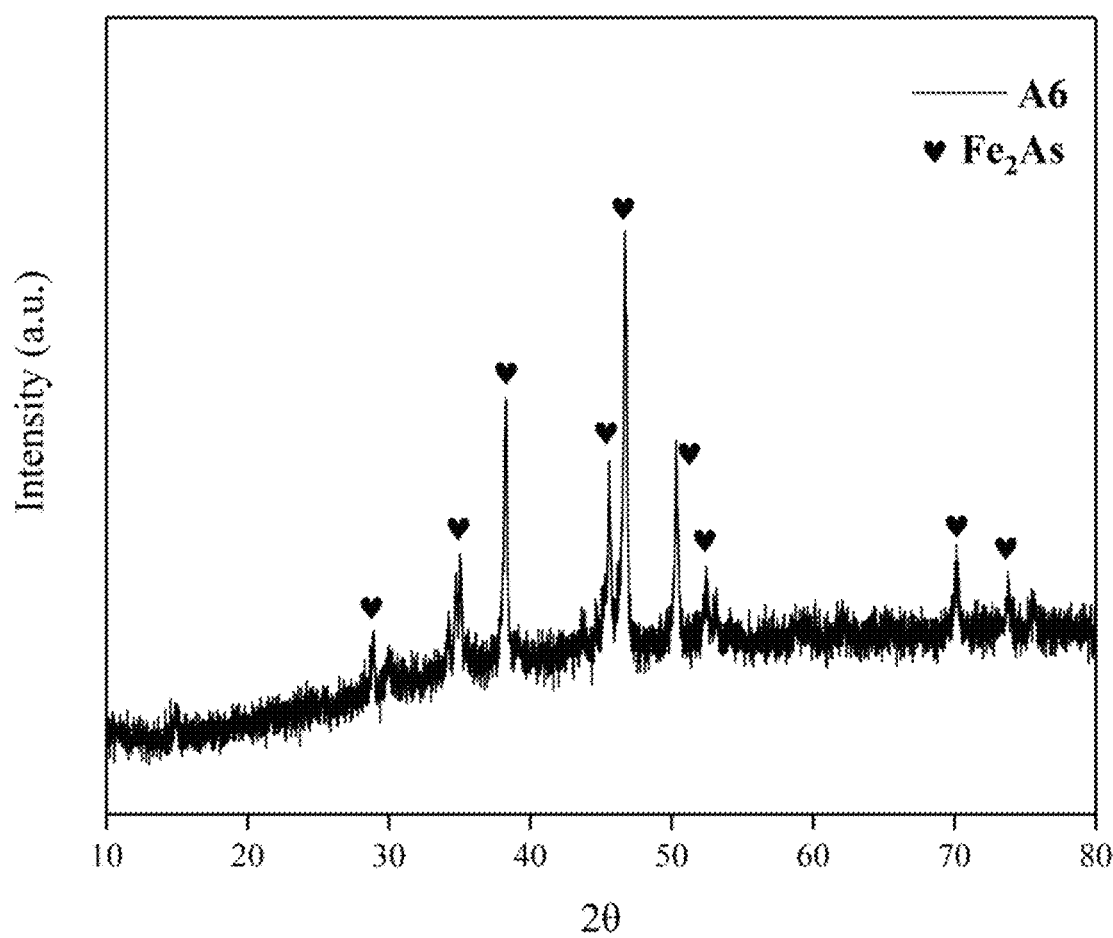
FIG. 12 is the XRD pattern of the arsenic iron alloy in example 6 of the present disclosure.

As can be seen from the XRD pattern in FIG. 12, with the increase of arsenic content, the main phase of the arsenic iron alloy (A6) in present example is $Fe_2As$ phase, and there is no a Fe phase.

The properties of the arsenic iron alloy in present example are shown in analysis Example 1. It can be seen that the arsenic iron alloy in present example has outstanding alloy properties and low leaching toxicity.

Example 7

During the test, compared with Example 1, only the molar ratio of the arsenic powder to the iron powder in step 1 is adjusted to 0.4:0.6 in present example.
Test Results:

The appearance picture of the arsenic iron alloy in the present example is the same as that in Example 1, which is cylinder shaped with a diameter of about 12 mm.

Figure 13B:
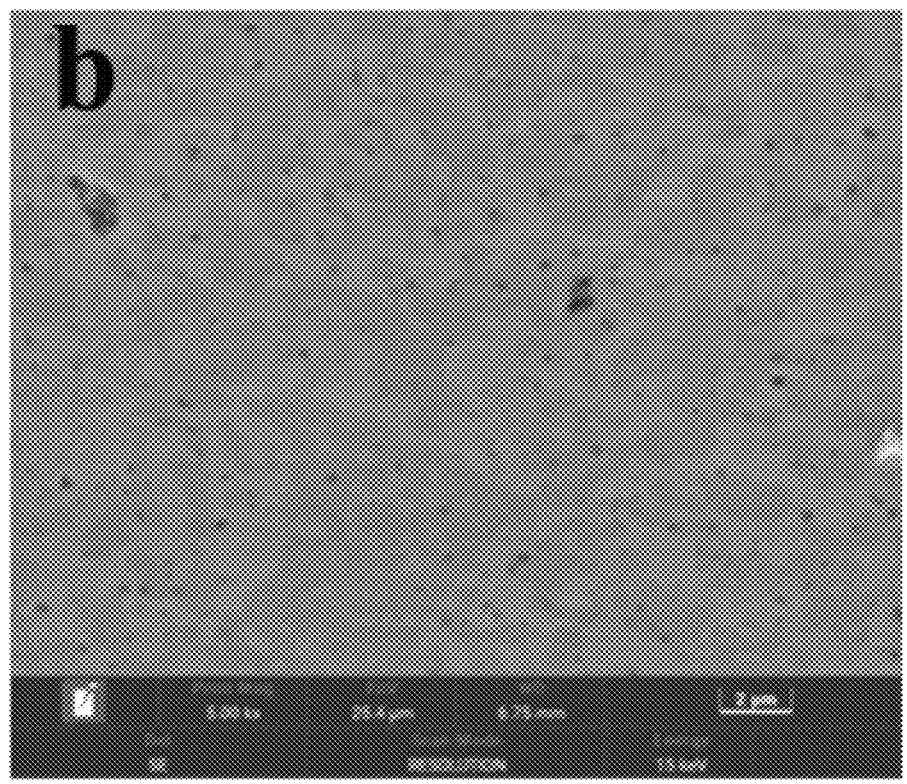
FIG. 13(b) is the topography picture of the arsenic iron alloy amplified 5 kx times in example 7 of the present disclosure.

It can be seen from the topography picture of FIG. 13(b) that the arsenic iron alloy is generally uniform. Compared with Example 1, there is no agglomeration of iron elements, and the surface grain increases and the size thereof is smaller.

Figure 14:
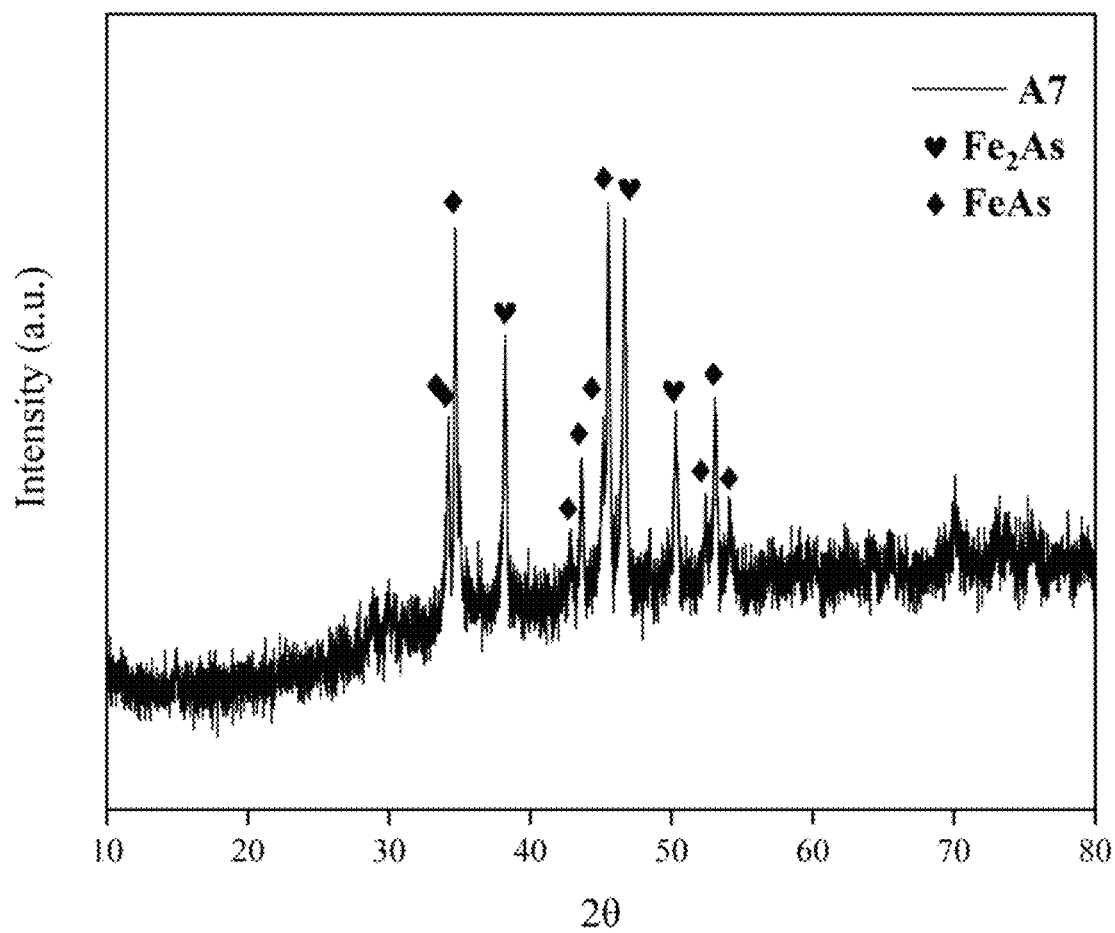
FIG. 14 is the XRD pattern of the arsenic iron alloy in example 7 of the present disclosure.

As can be seen from the XRD pattern in FIG. 14, with the increase of arsenic content, the main phases of the arsenic iron alloy (A7) in present example are $Fe_2As$ phase and FeAs phase, and there is no a Fe phase.

The properties of the arsenic iron alloy in present example are shown in analysis Example 1. It can be seen that the arsenic iron alloy in present example has outstanding alloy properties and low leaching toxicity.

Example 8

During the test, compared with Example 1, only the molar ratio of arsenic powder to iron powder in step 1 is adjusted to 0.5:0.5 in present example.
Test Results:

The appearance picture of the arsenic iron alloy in the present example is the same as that in example 1, which is cylinder shaped with a diameter of about 12 mm.

Figure 15B:
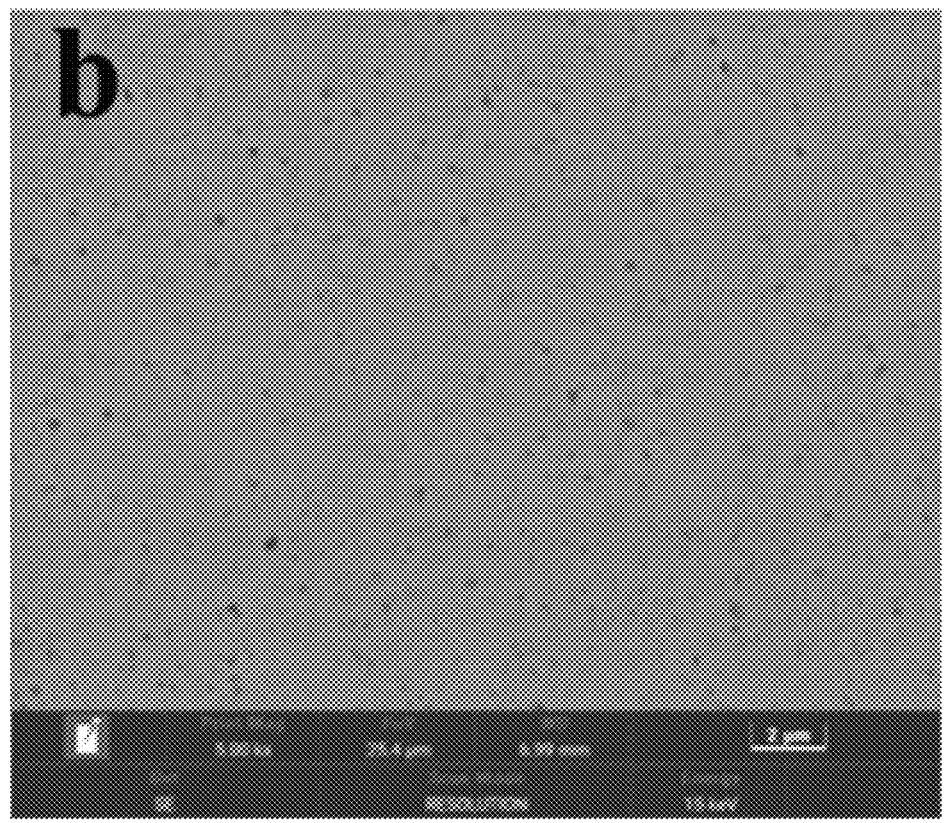
FIG. 15(b) is the topography picture of the arsenic iron alloy amplified 5 kx times in example 8 of the present disclosure.

It can be seen from the topography picture of FIG. 15(b) that the arsenic iron alloy is generally uniform. Compared with Example 1, there is no agglomeration of iron elements, and the surface grain increases and the size thereof is smaller.

Figure 16:
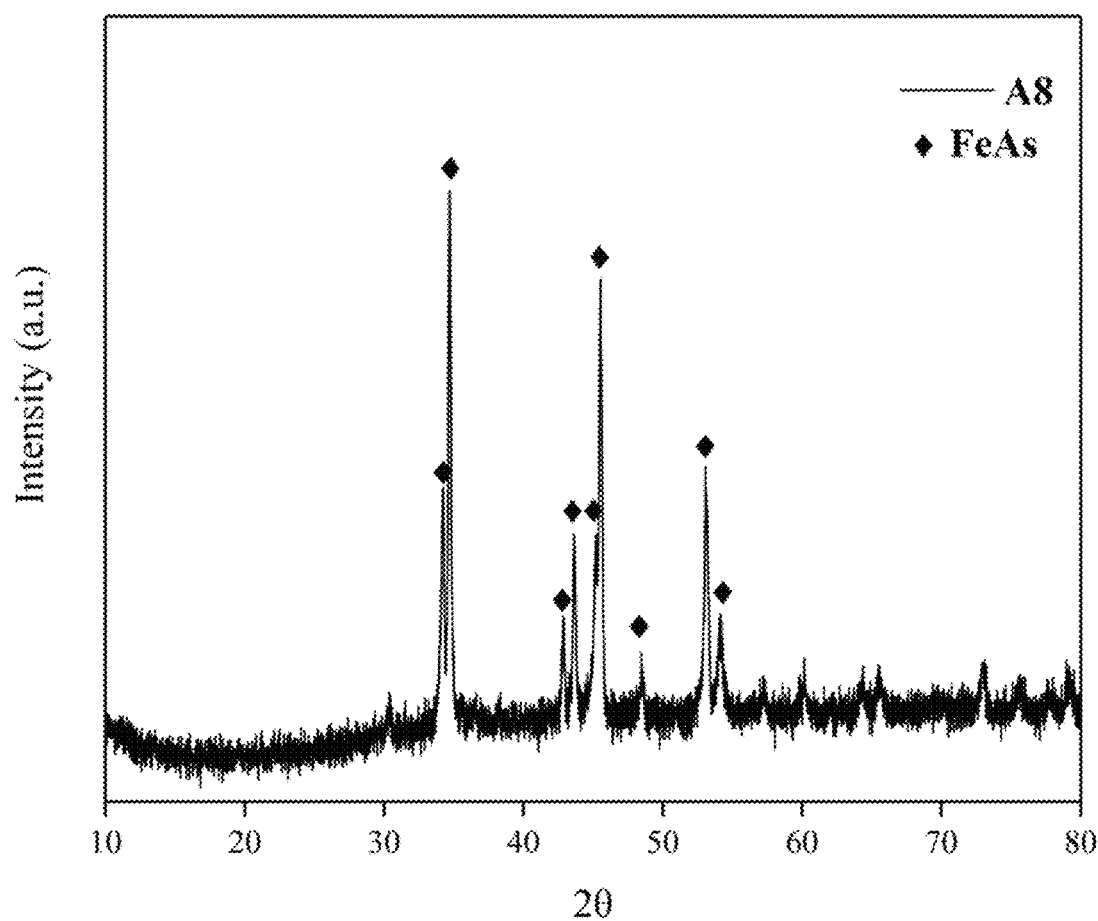
FIG. 16 is the XRD pattern of the arsenic iron alloy in example 8 of the present disclosure.

As can be seen from the XRD pattern in FIG. 16, with the increase of arsenic content, the main phase of the arsenic iron alloy (A8) in present example is FeAs phase, and there is no a Fe phase and $Fe_zAs$ phase.

The properties of the arsenic iron alloy in present example are shown in analysis Example 1. It can be seen that the arsenic iron alloy in present example has outstanding alloy properties and low leaching toxicity.

Example 9

During the test, compared with Example 1, only the molar ratio of the arsenic powder to the iron powder in step 1 is adjusted to 0.6:0.4 in present example.
Test Results:

The appearance picture of the arsenic iron alloy in the present example is the same as that in Example 1, which is cylinder shaped with a diameter of about 12 mm.

Figure 17B:
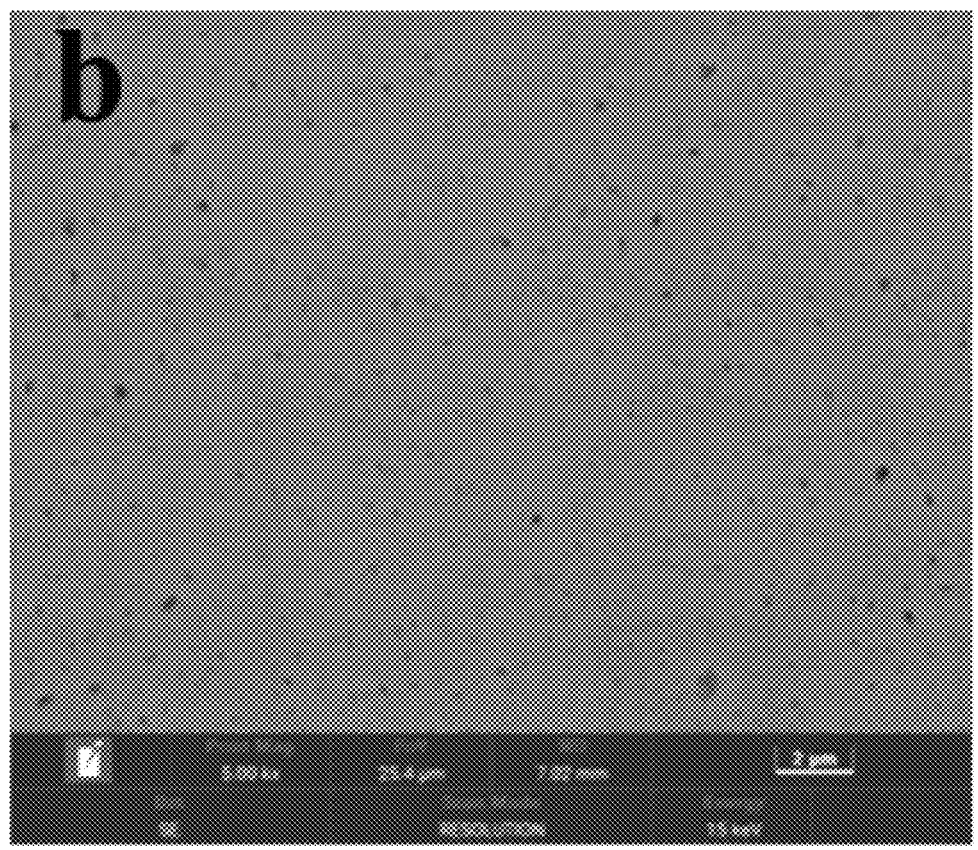
FIG. 17(b) is the topography picture of the arsenic iron alloy amplified 5 kx times in example 9 of the present disclosure.

It can be seen from the topography of FIG. 17(b) that the arsenic iron alloy is generally uniform. Compared with Example 1, there is no agglomeration of iron elements, and the surface grain increases and the size thereof is smaller.

Figure 18:
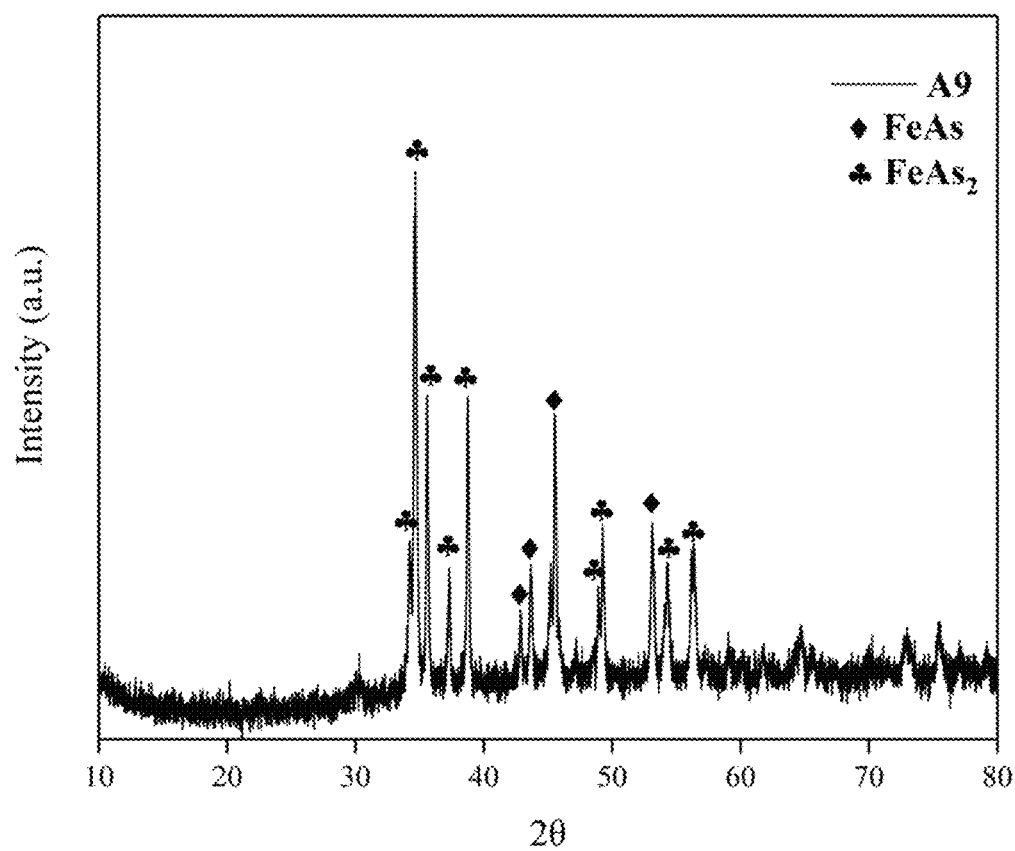
FIG. 18 is the XRD pattern of the arsenic iron alloy in example 9 of the present disclosure.

As can be seen from the XRD pattern in FIG. 18, with the increase of arsenic content, the main phase of the arsenic iron alloy (A9) in present example is FeAs phase and $FeAs_2$ phase, there is no a Fe phase and $Fe_zAs$ phase.

The properties of the arsenic iron alloy in present example are shown in analysis Example 1. It can be seen that the arsenic iron alloy in present example has outstanding alloy properties and low leaching toxicity.

Comparative Example 1

In the course of the test, compared with Example 1, only the molar ratio of the arsenic powder to the iron powder in step 1 is adjusted to 0.7:0.3.
Test Results:

The appearance picture of the arsenic iron alloy in the present comparative example is the same as that in example 1, which is cylinder shaped with a diameter of about 12 mm.

Figure 19B:
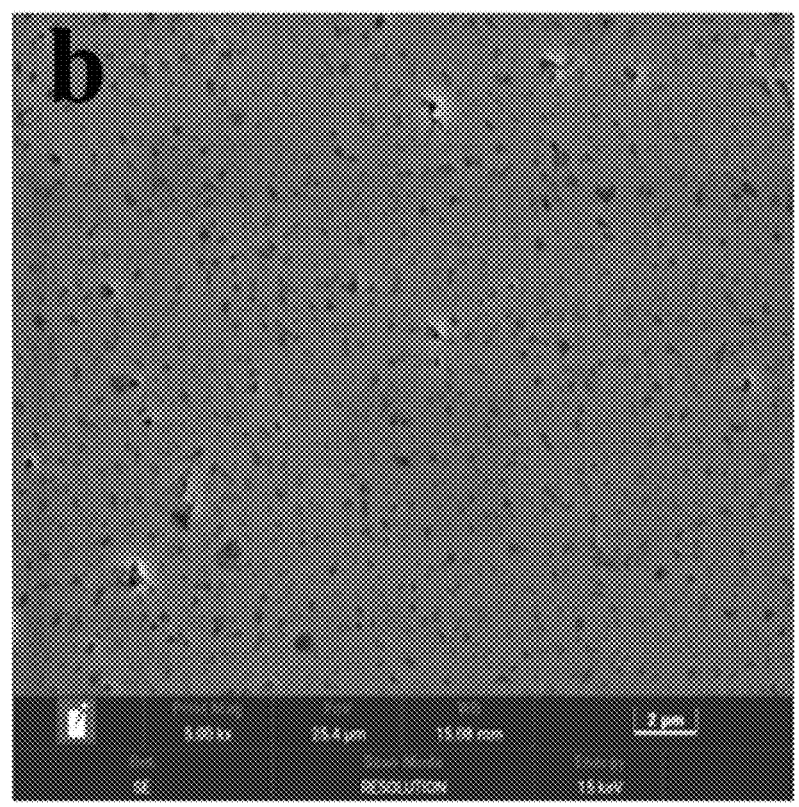
FIG. 19(b) is the topography picture of the arsenic iron alloy amplified 5 kx times in comparative example 1 of the present disclosure.

It can be seen from the topography picture of FIG. 19(b) that the arsenic iron alloy is generally uniform. Compared with Example 1, there is no agglomeration of iron elements, and the surface grain size is larger.

Figure 20:
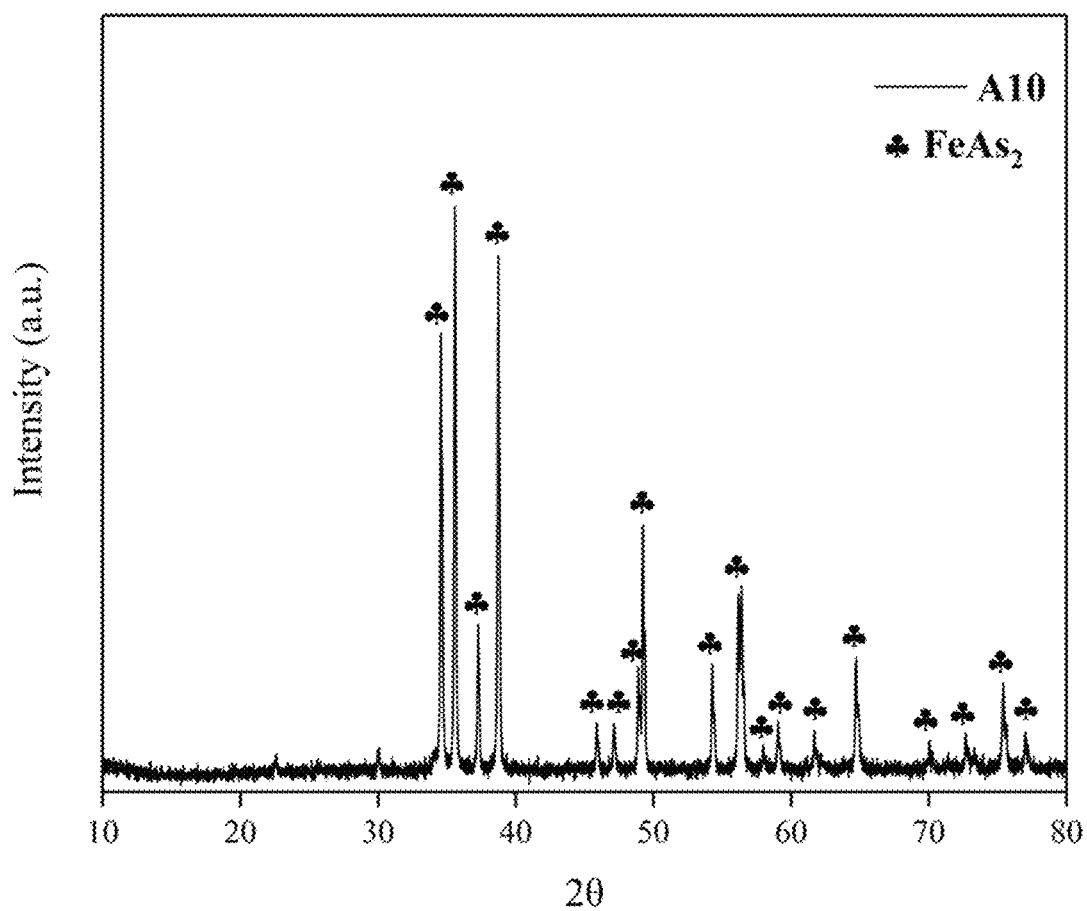
FIG. 20 is the XRD pattern of the arsenic iron alloy in comparative example 1 of the present disclosure.

As can be seen from the XRD pattern in FIG. 20, with the increase of arsenic content, the main phase of arsenic iron alloy (A10) in the present comparative example is $FeAs_2$ phase, there is no a Fe, $Fe_zAs$ and FeAs phases.

The properties of the arsenic iron alloy in the present comparative example are shown in analysis Example 1. It can be seen that the arsenic iron alloy in the present comparative example has decreased properties and high leaching toxicity.

Comparative Example 2

Steps 1 and 2 of the present comparative example are the same as that in Example 1.

In step 3 of the present comparative example, the sample obtained in step 2 is put into a mold of a powder tablet press machine and is cold pressed at 30 MPa for 20 min.

Subsequently, the obtained sample is placed in a quartz tube. The quartz tube is vacuum sealed, and is finally placed in a tube furnace for sintering.

Among them, the sample is sintered by the tube furnace according to the following Settings:

Raising the temperature to 400° C. at a rate of 10° C./min and holding for 30 min, then raising to 800° C. at a rate of 10° C./min and holding for 60 min, and finally falling to room temperature with the furnace;

When the temperature is fell to room temperature, the arsenic iron product of the present comparative example can be obtained.

Figure 21:
FIG. 21 is an appearance picture of the arsenic iron alloy in comparative example 2 of the present disclosure.

Arsenic iron alloy cannot be obtained by the present comparative example. The appearance picture of the arsenic iron product in the present comparative example is shown in FIG. 21. It can be seen that the arsenic iron alloy block prepared by the arsenic and iron product in the present comparative example has loose surface with obvious holes, and has poor bonding degree after sintering, resulting in poor density, and obvious has powder particles remain. The original cylindrical sample is easily cracked after being taken out without pressure test. It can be seen that the strength of arsenic iron alloy block prepared by cold pressing sintering method is poor, and the mechanical properties of arsenic iron alloy blocks can not meet the requirements of conventional applications.

Analysis Example 1

Performance tests are performed on the properties of arsenic iron alloys of example 1-9 and of comparative example 1:

Density: the density of each embodiment sample is tested by AKD-220A touch screen high-precision solid density tester, according Archimedes principle buoyancy method.

Compressive strength: tested by electronic universal testing machine.

Hardness test: tested by Vickers hardness tester.

Leaching toxicity: evaluated by National standard method.

The test results are shown in the following table:

| numbers | density (g cm$^{-3}$) | compressive strength (MPa) | hardness (HV0.5) | leaching toxicity (As/mg L$^{-1}$) |
|---|---|---|---|---|
| example 1 | 7.5957 | 140 | 482.9 | 0.15 |
| example 2 | 7.5552 | 140 | 507.15 | 0.16 |
| example 3 | 7.6357 | 140 | 471.63 | 0.19 |
| example 4 | 7.6120 | 140 | 506.08 | 0.06 |
| example 5 | 7.5973 | 140 | 514.43 | 16.5 |
| example 6 | 7.6008 | 140 | 562.23 | 20.6 |
| example 7 | 7.6035 | 140 | 663.87 | 18.45 |
| example 8 | 7.4532 | 140 | 825.94 | 34.17 |
| example 9 | 7.4123 | 140 | 899.41 | 38.29 |
| comparative example 1 | 6.6229 | 140 | 559.39 | 257.87 |

In summary, iron content, grain size and phase have great influence on leaching toxicity and mechanical properties of the product. When there has more Fe element, the grain size is smaller, and the phase is $Fe_2As$, the arsenic iron alloy is stable and has better properties. Compared with $Fe_2As$ phase, the FeAs and $FeAs_2$ phase have lower corrosion resistance, resulting in higher leaching toxicity. As the arsenic content increases, the grain size decreases overall and when an As/Fe ratio is 0.6:0.4, the strength of the product reaches its maximum, which may be attributed to the formation of regular tetrahedron $FeAs_4$ with an As—Fe—As angle close to 109.4° during hot pressed sintering at that ratio. However, as the content of arsenic increases, the hardness of the product decreases greatly. This could be attributed to that the high arsenic content weakens the grain boundary cohesion and causes the alloy to embrittle and causes the tetrahedron to deviate from the regular shape, resulting in a significant decrease in hardness.

In the above technical scheme of the disclosure, the above is only the optimal embodiment of the present disclosure, and does not therefore limit the scope of the patent of the present disclosure. Under the technical idea of the disclosure, the equivalent structure transformation made by using the contents of the specification and drawings of the disclosure, or the direct/indirect application in other related technical fields are included in the scope of patent protection of the disclosure.

What is claimed is:
1. A preparation method for an arsenic iron alloy, comprising:
   ball milling arsenic powder and iron powder under protection of inert atmosphere according to a molar ratio of 0.1-0.35:1 or 0.35-2:1 to obtain pretreated material;
   the ball milling process comprising a plurality of ball milling cycles, a ball milling duration of each ball milling cycle being 30 min to 60 min, and an interval duration between two adjacent ball milling cycles being 5 min to 15 min;
   in the ball milling process, a rotating speed of the ball milling being 250 r/min to 400 r/min, a weight ratio of ball to material being 10-20:1, and a total time of the ball milling being 8 h to 48 h;
   a grain size of the ball used in the ball milling process is selected from one or more of 3 mm, 6 mm, 10 mm, and 15 mm; and
   vacuum hot press sintering the pretreated material to obtain arsenic iron alloy;
   wherein, the vacuum hot press sintering process comprises:
   placing the pretreated material in a vacuum environment; and
   sintering the pretreated material; in the sintering process, a pressure of 30-50 MPa being applied to the pretreated material;
   wherein the sintering process comprises:
   heating the pretreated material from room temperature to 400-500° C., and holding for 0.5-1 h; and heating the pretreated material from 400-500° C. to 600-800° C., and holding for 0.5-1 h.

2. The preparation method of claim 1, wherein the arsenic powder and the iron powder are mixed to obtain mixed powder before the ball milling process of the arsenic powder and the iron powder.

3. The preparation method of claim 1, wherein a purity of the arsenic powder is not less than 98.0 wt. 9%, and a purity of the iron powder is not less than 98.0 wt. %.

4. The preparation method of claim 1, wherein the inert atmosphere comprises one or more of argon and nitrogen.

* * * * *